May 31, 1949. W. H. BISHOP 2,471,557
OIL SEAL REMOVING TOOL
Filed Dec. 20, 1944
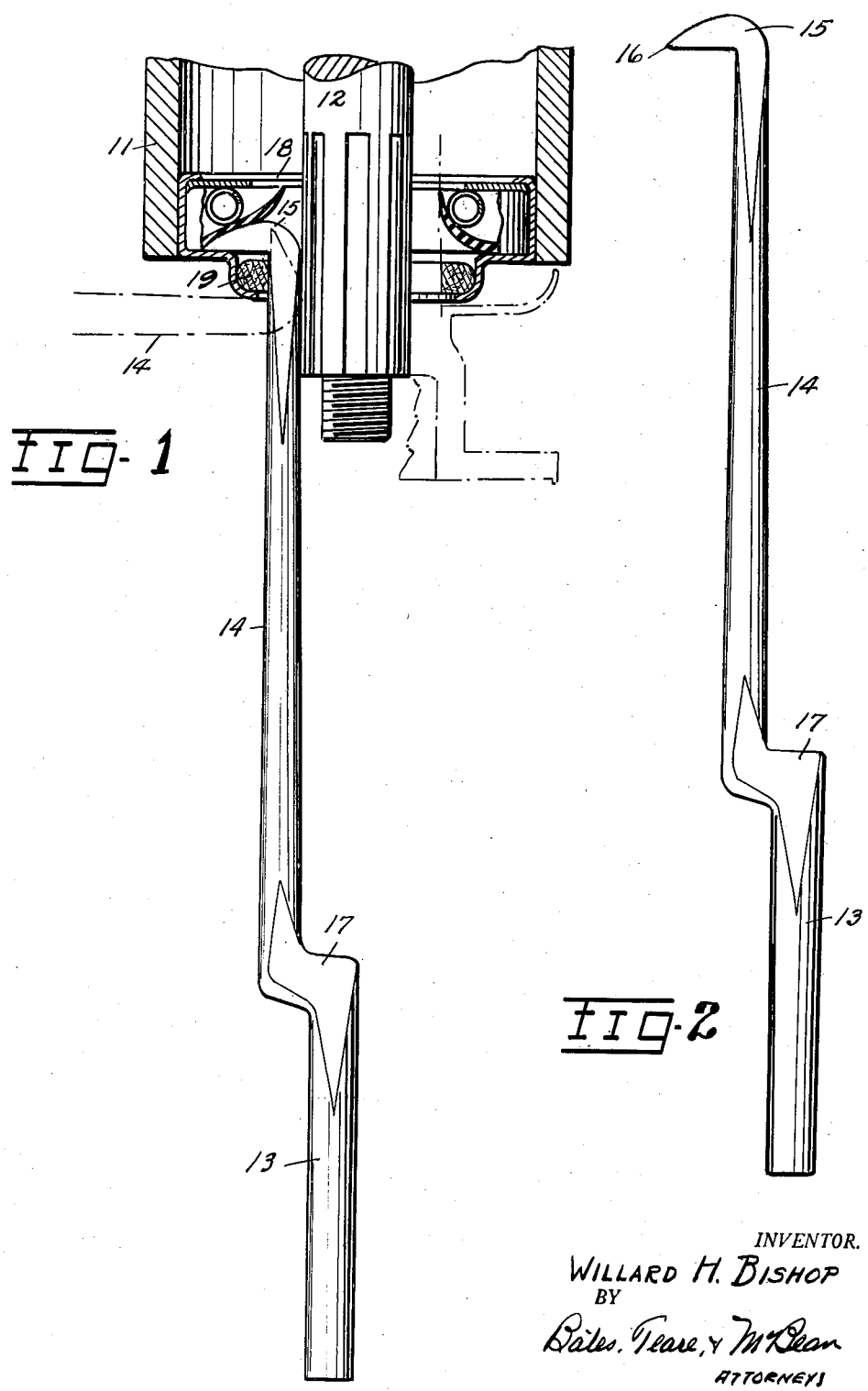
INVENTOR.
WILLARD H. BISHOP
BY
Bates, Teare, & McKean
ATTORNEYS Patented May 31, 1949

2,471,557

UNITED STATES PATENT OFFICE 2,471,557

OIL SEAL REMOVING TOOL

Willard H. Bishop, Garrettsville, Ohio

Application December 20, 1944, Serial No. 569,021

1 Claim. (Cl. 81—8.1)

This invention relates generally to the class of tools and pertains particularly to an improved tool for removing from shafts, grease retainers or bearing oil seals such as are employed in numerous types of machines such, particularly, as automobiles.

In certain mechanical structures such as automobiles, there are employed annular grease retaining or bearing oil sealing devices which are maintained tightly in a housing, in encircling relation with a shaft extending through such housing. In the making of necessary repairs it is required that such seal or grease retainer be withdrawn from the housing and since the retainer is in encircling relation with a shaft and is tightly wedged in the housing its removal is extremely difficult.

A principal object of the present invention is to provide a novel tool for facilitating the removal of such bearing oil seals from the housings in which they are secured.

Another object of the invention is to provide a tool of the character above described, which is adapted to be inserted into the seal and is constructed to provide a driving shoulder or anvil which may be struck with a hammer to effect the outward movement of the tool and the withdrawal of the seal from its housing.

The invention will be best understood from a consideration of the following detailed description taken in connection with the accompanying drawing forming a part of the specification, with the understanding, however, that minor changes and modifications may be made in the invention so long as such changes or modifications do not depart materially from the salient features of the invention as expressed in the appended claim.

In the drawing, Fig. 1 is an axial section through a housing surrounding an axle with an interposed seal showing the tool in its position of use and indicating in broken lines its position when first inserted; Fig. 2 is a view of the tool itself.

Referring now more particularly to the drawing the numeral 10 generally designates a bearing oil seal or grease retaining annulus such as is commonly employed in various types of machines for maintaining grease or oil around a shaft or around a bearing assembly within a housing. Such housing is generally designated 11 and the shaft passing therethrough and through the seal 10, is generally designated 12. The seal such as that here illustrated is to be found in the rear axle assembly of a motor vehicle where the axle here designated 12 forms a part of the axle drive pinion and has keyed to the fluted end portion thereof which passes through the oil seal 10, the axle drive pinion flange, not shown, which extends through and is encircled by the oil seal. While this particular part of a motor vehicle assembly has been illustrated and described it is to be understood that there is no intention by reason of the making of such illustration and description, to limit the invention in any manner in its use as it will be readily apparent to those versed in the art that the hereinafter described tool constituting the present invention will be of service in connection with the use of bearing oil seals or grease retainers of a similar character, used in other assemblies.

In accordance with the present invention the bearing oil seal removing tool comprises a bar 13 of steel, of suitable length and diameter, which has formed integrally with one end and in offset relation with the longitudinal center of the bar, a relatively long slightly tapering shank 14 which is of substantial length and which terminates at its free end in the rounded head 15. This head is extended outwardly in a direction away from that side of the bar to which the inner end of the shank 14 is joined, to form the hook bill 16. The inner face of the hook bill extends at substantially a right angle to the shank and the outer face of the bill is curved from a point where it leaves the shank to the point of the hook bill.

The end of the bar 13 where the shank 14 is joined to the side of the bar, is provided to form an anvil 17 against which a hammer may be struck to effect the longitudinal movement of the bar and the shank in the operation of withdrawing the oil seal from within its housing.

In the operation or use of the oil seal removing tool where, for example, it may be employed for removing the oil seal from a rear axle assembly, the usual nut and washer and flange, not shown, are removed from the pinion axle or shaft 12 and thus a small space is provided at 18 between the interior of the seal and the shaft into which the rounded head 15 of the tool may be introduced.

The rounded end of the head is then placed against the shaft with the shank and bar extending outwardly in substantially perpendicular relation with the shaft and the point of the bill 16 is directed inwardly into the inside of the seal. The tool is then oscillated to bring it into a position substantially parallel with the shaft, while at the same time forcing the point of the head inwardly so that when the tool is finally brought to a position in substantially parallel relation with the axle shaft, the point of the bill will be hooked behind the felt ring 19 and upon the inner side of the adjacent flange of the seal.

After the tool has been brought to this final position a pull is applied to draw the seal outwardly from the housing and if force is necessary then a hammer may be used to drive against the anvil 17 so as to effect the forcible extraction of the seal.

From the foregoing it will be readily apparent that there has been provided in the present invention a relatively simple but efficient tool for the performance of a job which heretofore has been relatively difficult but which, with the present tool is accomplished easily and quickly.

I claim:

A tool for removing an oil seal from a housing surrounding an axle, the seal having a metal outer wall overhanging a yielding packing, said tool comprising a bar having a substantially straight shank and having a handle at one end extending in the same direction as the shank and connected with it by an offset portion, the shank at the other end being provided with a hook bill coming substantially to a point, the inner face of the bill extending at substantially a right angle to the shank and the outer face of said bill being curved from a point where it leaves the shank to said point of the hook bill, the said point being located a sufficient distance from the shank so that when the bill is inserted between the axle and seal and swung into position within the seal it will extend beyond the packing and bear against the inner face of said outer wall of the seal.

WILLARD H. BISHOP.

REFERENCES CITED

The following references are of record in the file of this patent:

UNITED STATES PATENTS

| Number | Name | Date |
|---|---|---|
| 1,632,482 | Kroells | June 14, 1927 |
| 1,828,142 | Herdman | Oct. 20, 1931 |
| 1,903,548 | Kreis | Apr. 11, 1933 |
| 2,207,661 | Dugan | July 9, 1940 |
| 2,275,393 | Myers | Mar. 3, 1942 |